US012073691B2

(12) United States Patent
Ideus, II et al.

(10) Patent No.: US 12,073,691 B2
(45) **Date of Patent: *Aug. 27, 2024**

(54) SYSTEMS AND METHODS FOR EVALUATING A PERSISTENT BONUS GAME JACKPOT AGAINST A DYNAMICALLY SELECTED PAYTABLE

(71) Applicant: Aristocrat Technologies, Inc., Las Vegas, NV (US)

(72) Inventors: Eldon Ideus, II, Brentwood, TN (US); Michael Casey, Reno, NV (US); Kevin Walsh, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,554

(22) Filed: May 4, 2023

(65) Prior Publication Data

US 2023/0274613 A1 Aug. 31, 2023

Related U.S. Application Data

(63) Continuation of application No. 17/671,400, filed on Feb. 14, 2022, now Pat. No. 11,776,358, which is a (Continued)

(51) Int. Cl.
*G07F 17/32* (2006.01)

(52) U.S. Cl.
CPC ...... *G07F 17/3258* (2013.01); *G07F 17/3227* (2013.01); *G07F 17/3267* (2013.01); *G07F 17/3288* (2013.01)

(58) Field of Classification Search
None
See application file for complete search history.

(56) References Cited

U.S. PATENT DOCUMENTS 6,581,935 B1 6/2003 Odom
7,717,785 B2 5/2010 Odom
(Continued)

OTHER PUBLICATIONS

Office Action dated May 7, 2021 for U.S. Appl. No. 16/752,216 (pp. 1-9).

(Continued)

*Primary Examiner* — Jason T Yen
(74) *Attorney, Agent, or Firm* — Armstrong Teasdale LLP

(57) ABSTRACT

A system and method for evaluating a persistent bonus game jackpot includes providing a persistent bonus game jackpot including an amount that defines a state of the persistent bonus game jackpot, storing, within a memory, a plurality of paytables, each paytable of the plurality of paytables associated with a state of the persistent bonus game jackpot and including a probability of awarding the persistent bonus game jackpot at the associated state, determining a current state of the persistent bonus game jackpot, dynamically selecting, based upon the determined current state, a paytable from the plurality of paytables stored in the memory, evaluating a bingo card provided in association with the persistent bonus game jackpot against the dynamically selected paytable and a ball call, and determining, in response to the evaluating, to credit the amount of the persistent bonus game jackpot to a player credit balance associated with the evaluated bingo card.

20 Claims, 7 Drawing Sheets

Related U.S. Application Data continuation of application No. 16/752,216, filed on Jan. 24, 2020, now Pat. No. 11,250,667.

(60) Provisional application No. 62/801,724, filed on Feb. 6, 2019.

(56) References Cited

U.S. PATENT DOCUMENTS

| | | | | |
|---|---|---|---|---|
| 9,600,962 | B2 | 3/2017 | Weingardt | |
| 2006/0046827 | A1 | 3/2006 | Saffari | |
| 2006/0073887 | A1 * | 4/2006 | Nguyen | G07F 17/3262 463/27 |
| 2007/0060365 | A1 * | 3/2007 | Tien | G07F 17/3258 463/42 |
| 2009/0075714 | A1 * | 3/2009 | Meyer | G07F 17/32 463/19 |
| 2009/0124333 | A1 * | 5/2009 | Nelson | G07F 17/3258 463/16 |
| 2013/0150141 | A1 * | 6/2013 | Olsen | G07F 17/3258 463/19 |
| 2013/0225277 | A1 * | 8/2013 | Hughes | G07F 17/3258 463/27 |
| 2014/0094293 | A1 * | 4/2014 | Nicely | G07F 17/323 463/27 |
| 2016/0063817 | A1 * | 3/2016 | Guinn | G07F 17/3258 463/22 |
| 2018/0053380 | A1 | 2/2018 | Seymour | |
| 2019/0156630 | A1 | 5/2019 | Cuddy | |
| 2019/0325703 | A1 | 10/2019 | Melnick | |
| 2019/0392671 | A1 | 12/2019 | Nguyen | |

OTHER PUBLICATIONS

Office Action (Notice of Allowance and Fees Due (PTOL-85)) dated Oct. 20, 2021 for U.S. Appl. No. 16/752,216 (pp. 1-8).

Office Action (Non-Final Rejection) dated Nov. 18, 2022 for U.S. Appl. No. 17/671,400 (pp. 1-6).

Office Action (Notice of Allowance and Fees Due (PTOL-85)) dated Feb. 7, 2023 for U.S. Appl. No. 17/671,400 (pp. 1-9).

Office Action (Notice of Allowance and Fees Due (PTOL-85)) dated Jun. 1, 2023 for U.S. Appl. No. 17/671,400 (pp. 1-8).

* cited by examiner

SYSTEMS AND METHODS FOR EVALUATING A PERSISTENT BONUS GAME JACKPOT AGAINST A DYNAMICALLY SELECTED PAYTABLE

CROSS-REFERENCE TO RELATED APPLICATIONS

This application is a continuation of U.S. patent application Ser. No. 17/671,400, filed Feb. 14, 2022, entitled "SYSTEMS AND METHODS FOR evaluating a PERSISTENT BONUS GAME JACKPOT against A DYNAMICALLY SELECTED PAYTABLE," which is a continuation of U.S. patent application Ser. No. 16/752,216, filed Jan. 24, 2020, entitled "SYSTEMS AND METHODS FOR EVALUATING A PERSISTENT BONUS GAME JACKPOT AGAINST A DYNAMICALLY SELECTED PAYTABLE," which claims the benefit of priority to U.S. Provisional Patent Application No. 62/801,724, filed Feb. 6, 2019, entitled "SYSTEMS AND METHODS FOR EVALUATING A PROGRESSIVE JACKPOT AGAINST A DYNAMICALLY SELECTED PAY TABLE," the entire contents and disclosures of which are hereby incorporated by reference in their entirety.

TECHNICAL FIELD

The field of disclosure relates generally to electronic gaming, and more particularly, to systems and methods for evaluating a persistent bonus game jackpot against a dynamically selected paytable.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many EGMs are also implemented in conjunction with one or more progressive jackpots, such as, for example a tiered (or "multi-tier") plurality of progressive jackpots. A tiered plurality of progressive jackpots may include, for example, a lowest tier jackpot (associated with a lowest jackpot value), one or more mid-tier jackpots (associated with jackpot values greater than the lowest jackpot value and increasing therefrom), and a highest tier jackpot (associated with a highest jackpot value). During gameplay, one or more of these progressive jackpots may be incremented, such as based upon a player wager, and/or awarded.

Some progressive jackpots also specify a "must-hit-by" value, such as, for example, a maximum jackpot value, which, if reached, results in a guaranteed award of the progressive jackpot. For example, a must-hit-by progressive jackpot having a must-hit-by value of $1000 would be programmed such that the progressive jackpot would be provided or awarded to a player, at least (if not before), reaching the must-hit-by value of $1000. In multi-tier progressives, as described above, each jackpot in the tiered plurality of jackpots may be associated with a unique must-hit-by value.

To accommodate must-hit-by progressives, many Class III (i.e., so-called "Las Vegas style" or "casino style") gaming systems determine a probability of awarding a must-hit-by progressive jackpot based upon a randomly generated number. Specifically, a random number is generated and evaluated against a paytable that includes some subset of all possible random numbers that can be generated. As the value of the must-hit-by progressive approaches the must-hit-by value, the collection of random numbers that will result in an award of the progressive increases until, finally, all random numbers that can be generated result in an award of the progressive jackpot as the jackpot reaches the must-hit-by value.

This process for determining when to award a progressive jackpot in a Class III system is unsuitable, however, in many Class II games, such as Class II bingo games, where jurisdictional and regulatory requirements may simply prohibit the use of a Las Vegas or casino-style outcome determination. As a result, new processes for implementing progressive jackpots in Class II gaming systems are desirable. More particularly, processes for implementing must-hit-by progressive jackpots in Class II gaming systems are desirable, particularly processes that do not rely upon any sort of Class III random number determination.

SUMMARY

A system for evaluating a persistent bonus game jackpot against a plurality of paytables is provided. The system includes a processor and a memory, wherein the processor is configured to execute instructions stored in the memory which when executed, cause the processor to at least provide a persistent bonus game jackpot, the persistent bonus game jackpot including an amount that defines a state of the persistent bonus game jackpot of a plurality of states. The instructions, when executed, further cause the processor to store, within the memory, a plurality of paytables, each paytable of the plurality of paytables associated with a state of the persistent bonus game jackpot and including a probability of awarding the persistent bonus game jackpot at the associated state. The instructions, when executed, further cause the processor to determine a current state of the persistent bonus game jackpot. The instructions, when executed, further cause the processor to dynamically select, based upon the determined current state of the persistent bonus game jackpot, a paytable from the plurality of paytables stored in the memory. The instructions, when executed, further cause the processor to evaluate a bingo card provided in association with the persistent bonus game jackpot against the dynamically selected paytable and a ball call. The instructions, when executed, further cause the processor to determine, in response to the evaluating, to credit the amount of the persistent bonus game jackpot to a player credit balance associated with the evaluated bingo card.

A method for evaluating a persistent bonus game jackpot against a plurality of paytables is provided. The method includes providing a persistent bonus game jackpot, the persistent bonus game jackpot including an amount that defines a state of the persistent bonus game jackpot of a plurality of states. The method further includes storing, within a memory, a plurality of paytables, each paytable of the plurality of paytables associated with a state of the persistent bonus game jackpot and including a probability of awarding the persistent bonus game jackpot at the associated state. The method further includes determining a current state of the persistent bonus game jackpot. The method further includes dynamically selecting, based upon the determined current state of the persistent bonus game jackpot, a paytable from the plurality of paytables stored in the memory. The method further includes evaluating a bingo card provided in association with the persistent bonus game jackpot against the dynamically selected paytable and a ball call. The method further includes determining, in response to the evaluating, to credit the amount of the persistent bonus game jackpot to a player credit balance associated with the evaluated bingo card.

At least one non-transitory computer-readable media for evaluating a persistent bonus game jackpot against a plurality of paytables having instructions embodied thereon is disclosed. When executed by a gaming system including a processor and a memory, the instructions cause the processor to at least provide a persistent bonus game jackpot, the persistent bonus game jackpot including an amount that defines a state of the persistent bonus game jackpot of a plurality of states. The instructions, when executed, further cause the processor to store, within the memory, a plurality of paytables, each paytable of the plurality of paytables associated with a state of the persistent bonus game jackpot and including a probability of awarding the persistent bonus game jackpot at the associated state. The instructions, when executed, further cause the processor to determine a current state of the persistent bonus game jackpot. The instructions, when executed, further cause the processor to dynamically select, based upon the determined current state of the persistent bonus game jackpot, a paytable from the plurality of paytables stored in the memory. The instructions, when executed, further cause the processor to evaluate a bingo card provided in association with the persistent bonus game jackpot against the dynamically selected paytable and a ball call. The instructions, when executed, further cause the processor to determine, in response to the evaluating, to credit the amount of the persistent bonus game jackpot to a player credit balance associated with the evaluated bingo card.

BRIEF DESCRIPTION OF THE DRAWINGS

An example embodiment of the subject matter disclosed will now be described with reference to the accompanying drawings.

DETAILED DESCRIPTION

The systems and methods described herein provide a mechanism for determining whether to award a persistent bonus game jackpot (such as a progressive jackpot of a must-hit-by multi-tier progressive) provided in association with a Class II bingo game without the use of any Class III Las-Vegas style random number determination. As used herein, a persistent bonus game jackpot may be a jackpot awarded based in part upon specified current conditions (sometimes referred to herein as a "state"), rather than on an outcome of a base game (such as the base Class II bingo game). For example, a must-hit-by progressive jackpot is a persistent bonus game jackpot, and an accumulated value of the progressive jackpot and/or a range in which the accumulated value falls may be the state of the persistent bonus game jackpot. In at least some embodiments, a base game bingo card is provided in association with the base bingo game, and a separate jackpot bingo card is provided in association with a progressive bingo game.

A plurality of dynamically selectable paytables is also provided for evaluating the jackpot bingo card. For example, in embodiments wherein the persistent bonus game jackpot corresponds to a must-hit-by progressive jackpot, each paytable may correspond to a range of jackpot values, and an accumulated or current value of the jackpot may govern which paytable is selected for evaluating the jackpot bingo card. Further, as the value of the progressive jackpot approaches the must-hit-by value, paytables having improved or greater probabilities of awarding the jackpot may be selected, such that the progressive jackpot is guaranteed to hit, at least, when the accumulated value of the jackpot reaches the must-hit-by value.

Figure 1:
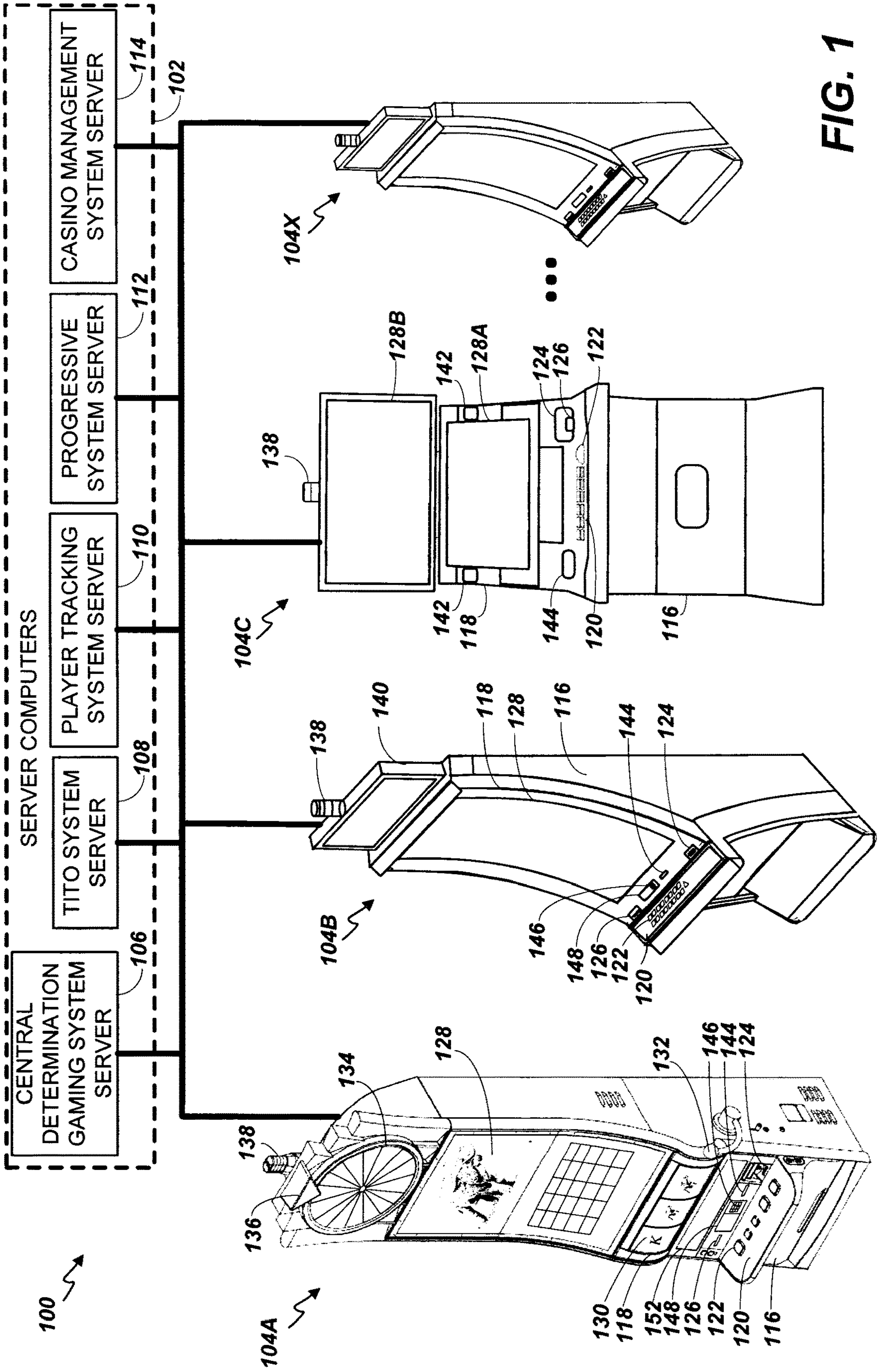
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X may require specialized software and/or hardware to form non-generic, particular machines or apparatuses that comply with regulatory requirements regarding devices used for wagering or games of chance in which monetary awards are provided.

Communication between the gaming devices 104A-104X and the server computers 102, and among the gaming devices 104A-104X, may be direct or indirect using one or more communication protocols. As an example, gaming devices 104A-104X can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow the gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
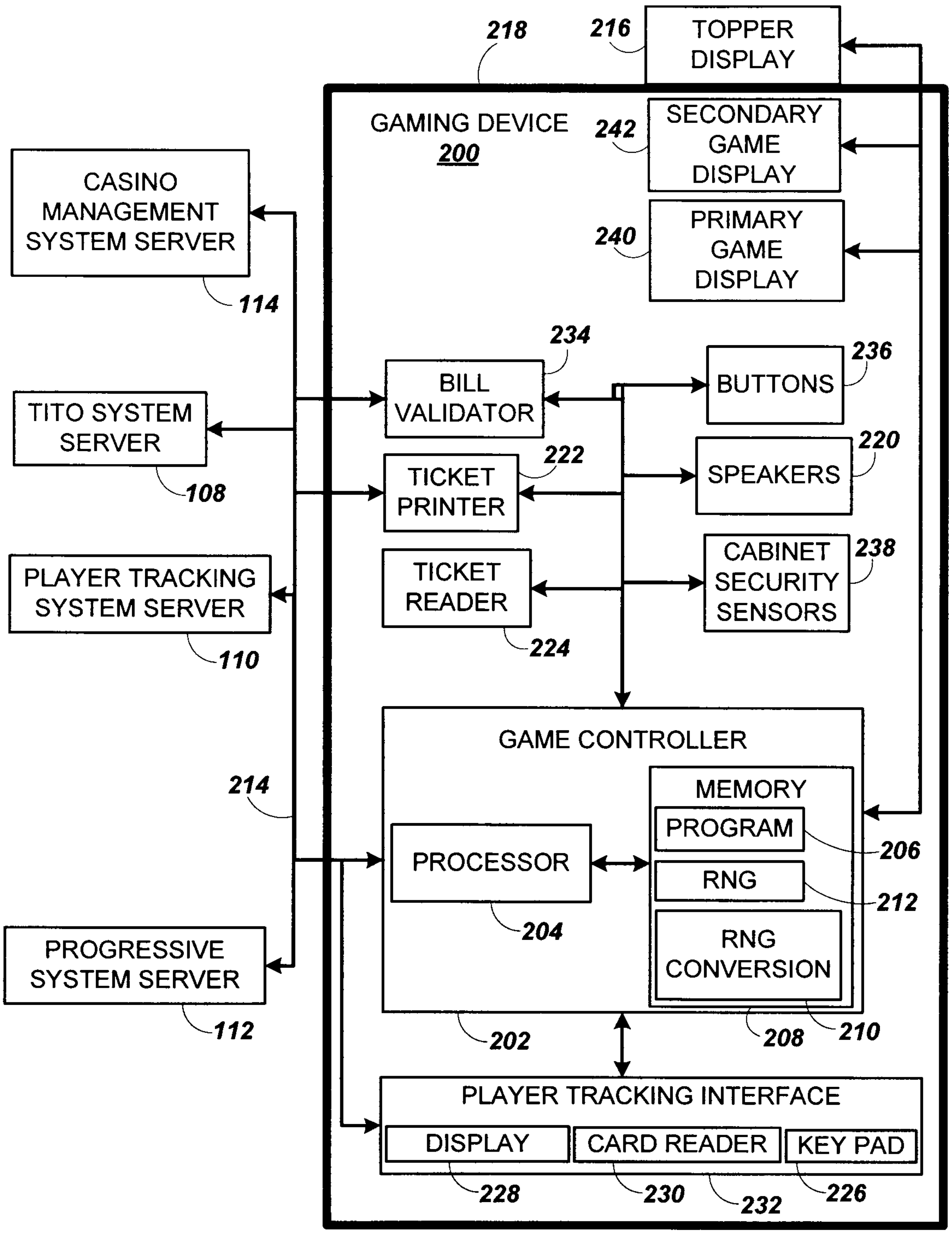
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EE-PROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204. Note that embodiments of the present disclosure represent an improvement in the art of EGM and server software and provide new technology in that they facilitate a Class II progressive award determination that does not reply on a Las-Vegas style random number determination (and which is jurisdictionally acceptable within most Class II gaming jurisdictions). These embodiments are thus not merely new game rules or simply a new display pattern.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term “game instance” refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a “random number”).

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Class II Game Operation

Figure 3:
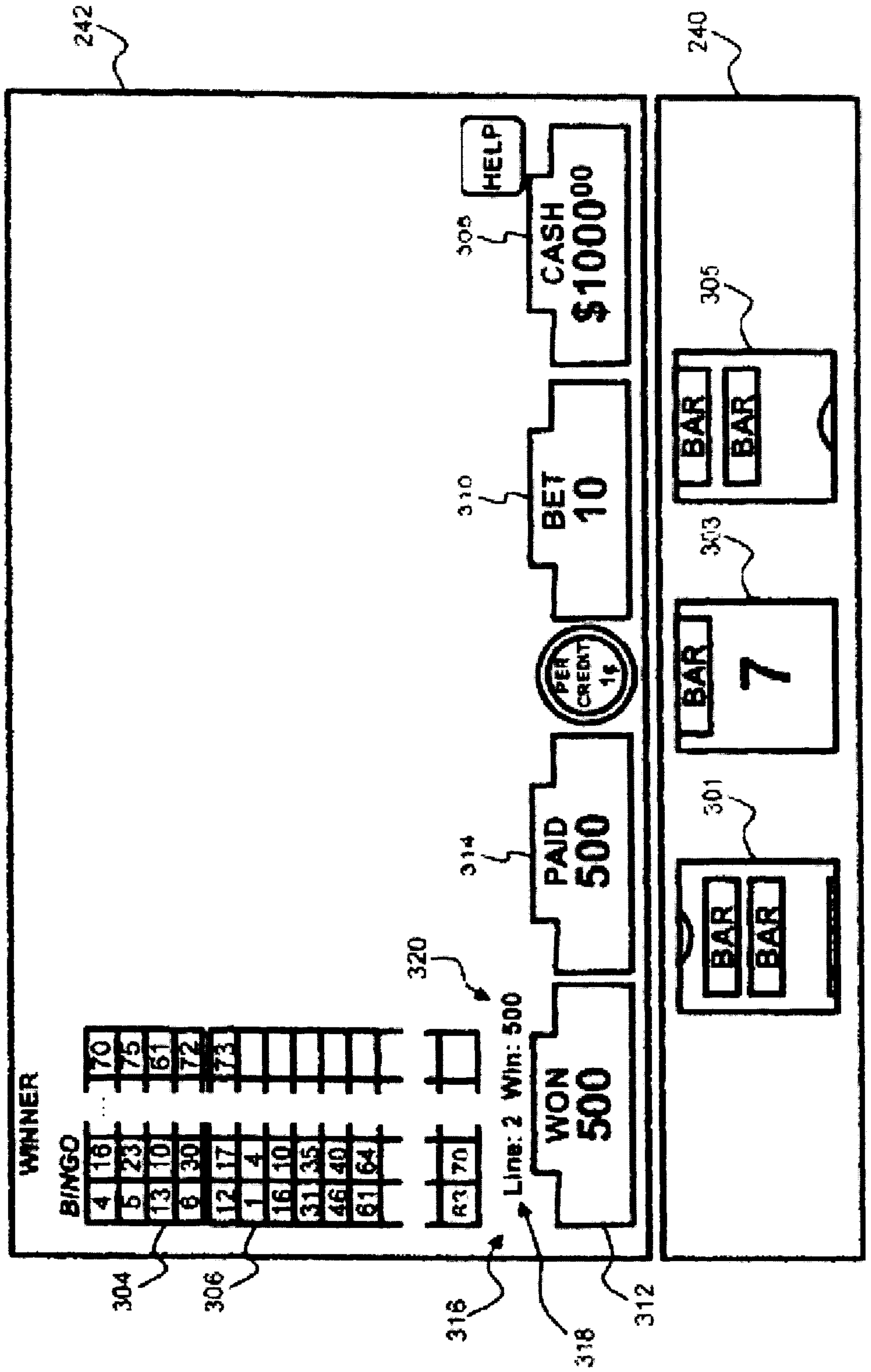
FIG. 3 is a screenshot of an example Class II bingo game being displayed on an EGM as shown in FIG. 1.

FIG. 3 depicts an example of a Class II bingo game being displayed in the primary game display 240 and secondary game display 242 of the EGM 200 of FIG. 2. In the example of FIG. 3, a plurality of reels 301, 303, and 305 are displayed within the primary game display 240. While only three reels 301, 303, 305 are shown in the example of FIG. 3, in some examples, more or fewer reels may be used. In some examples, the reels 301, 303, and/or 305 may be implemented as mechanical reels. As shown, each reel 301, 303, 305 has a plurality of symbol display positions for presenting symbols (and/or symbol combinations) which may be associated with winning and/or losing reel game outcomes and/or rewards.

In the example of FIG. 3, a bingo card 304 and a bingo number listing 306 are displayed in the secondary game display 242. As shown, the bingo card 304 comprises a matrix of bingo cells 302 (e.g., squares). In some examples, the matrix may be a 5×5 matrix of 25 total cells. In some examples, the bingo card 304 may have a matrix of a different size (e.g., 3×3, 4×4, 4×5, 4×6, 6×6, 7×7, 3×8, 10×10, etc.). In some examples, the matrix may be larger or smaller. In the example of FIG. 3, each cell 302 in the matrix of the bingo card 304 includes a number that is not repeated in any other cell of the bingo card 304.

In the example of FIG. 3, the secondary game display 242 further displays a credit meter 308 showing an amount of money and/or credits (e.g. credit balance) held by a player of the EGM 200. In the example of FIG. 3, the credit balance 308 shows $1000. The secondary display 242 additionally shows a wager meter 310 adjacent to the credit meter 308, under "BET." In the example of FIG. 3, the amount wagered is 10 credits (e.g., $0.10). The amount wagered (e.g., via the user interface) may be deducted from the credit meter 308. The secondary game display 242 additionally displays a win meter 312 and a total win meter 314. In the example of FIG. 3, the win meter 312 is 500, indicating that the simulated combination of symbols in reels 301, 303, 305 is associated with a 500 reward (which is equal to the reward associated with the bingo game outcome). As shown, the total win meter 314 is also 500, indicating that the cumulative total of rewards received comprises just that one 500 credit reward. In the example of FIG. 3, the secondary game display 242 further displays reel win information 316. The reel win information 316 includes win line information 318 and reward information 320. The win line information 318 indicates which win line in the reels 301, 303, 305 contains symbols comprising a winning reel game outcome. The reward information 320 indicates an associated reward amount for that winning reel game outcome.

In some examples, the bingo game may be a networked game that involves two or more networked EGMs 200. The central determination gaming system server 106 may manage (and/or host) the bingo game, such as by generating the bingo card 304 and/or bingo number listing 306. In some examples, the bingo card 304 (and/or information on which the bingo card 304 is based), and/or the bingo number listing 306 may be generated using an RNG. In some examples, the bingo card 304 may be randomly selected from a set of bingo cards or a player may select their own bingo card 304 (e.g., via the user interface), such as from a set of randomly generated bingo cards, for example.

In operation, a player and/or EGM 200 may be provided with the bingo card 304, such as by central determination gaming system server 106. For example, a player may be provided a new bingo card 304 each time a "Spin" or "Play" button is pressed by the player (e.g., via user interface), provided the player has made a wager. In some examples, more than one bingo card 304 may be generated in response to wager. The bingo number listing 306 (e.g., "ball call") may be randomly generated, such as by central determination gaming system server 106. The bingo card 304 may be compared to the current bingo number listing 306, and numbered cells 302 on the bingo card 304 that match numbers in the bingo number listing 306 may be marked or "daubed" on the bingo card 304. Finally, the marked or daubed bingo card 304 may be evaluated against a paytable of winning bingo patterns.

The bingo number listing 306 may be continually generated until a maximum amount of numbers are listed (e.g., seventy-five numbers listed) or until a game-ending pattern is awarded to a player participating in the bingo game. A typical game-ending pattern may be a bingo card blackout pattern, in which each of the numbers of a bingo card match a number displayed in the bingo number listing 306. Other game-ending patterns are also possible. When the game-ending pattern is awarded, the bingo number listing 306 is reset, and the process repeats. In some examples, a single play of the bingo game includes a wager, a bingo card, a bingo number listing 306, a matching of the numbers called with those on a bingo card 304, a determination of a bingo game outcome, and a presentation of an associated reward, if any.

A bingo game outcome may be determined by comparing one or more patterns of marked (and/or "daubed) cells of the bingo card 304 with the paytable of winning bingo patterns. If the bingo card 304 does not include a pattern that matches a pattern in the paytable of winning patterns, then a losing bingo outcome is determined, and no reward may be provided to the player. If the bingo card 304 does include a pattern that matches a pattern in the paytable of winning patterns, then a winning bingo outcome is determined, and a reward may be provided to the player.

Different winning patterns may be associated with different rewards. The reward for a winning main bingo game outcome may be based on an amount wagered, an associated main bingo game paytable, an associated set of rules for the main bingo game, a probability (and/or likelihood) of achieving a particular bingo pattern/combination, an amount of bingo numbers needed to achieve the particular bingo pattern/combination, and/or other considerations. In some examples, the player may be awarded for multiple patterns (e.g. all winning patterns) that are matched when the bingo card 304 is evaluated against the paytable of winning patterns. In some examples, the player may be rewarded for only the highest priority pattern (e.g. the highest paying winning pattern) that is matched. In some examples, during play of a Class II game, a player is provided or selects a single bingo card 304 for multiple plays of the bingo game, with a new bingo number listing 306 generated for each play of the bingo game. Other methods of play of a Class II bingo game are also possible and are within the scope of this disclosure.

The bingo game outcome may be presented to the player via a spinning reel game simulation. In the example of FIG. 3, the spinning reel game is simulated via the plurality of reels 301, 303 and 305 in the primary game display 240. For each play of the bingo game, the bingo game outcome is presented as a reel spin outcome in the reel game. In some examples, the spinning reel game simulation may operate by spinning each reel 301, 303, 305 and then stopping each reel 301, 303, 305 in a particular position to obtain a matrix of symbols. One or more combinations of symbols in the matrix of symbols may be associated with a reel game outcome that is equal to the main bingo game outcome. For example, a winning bingo game outcome may be displayed as a winning combination of reels 301, 303 and 305. Similarly, a losing bingo game outcome may be displayed as a losing combination of reels 301, 303 and 305. Different outcomes of the bingo game may be displayed as different outcomes in the spinning reel game. Thus, the bingo game outcome is presented to the player as a particular reel spin outcome of reels 301, 303 and 305.

Figure 4:
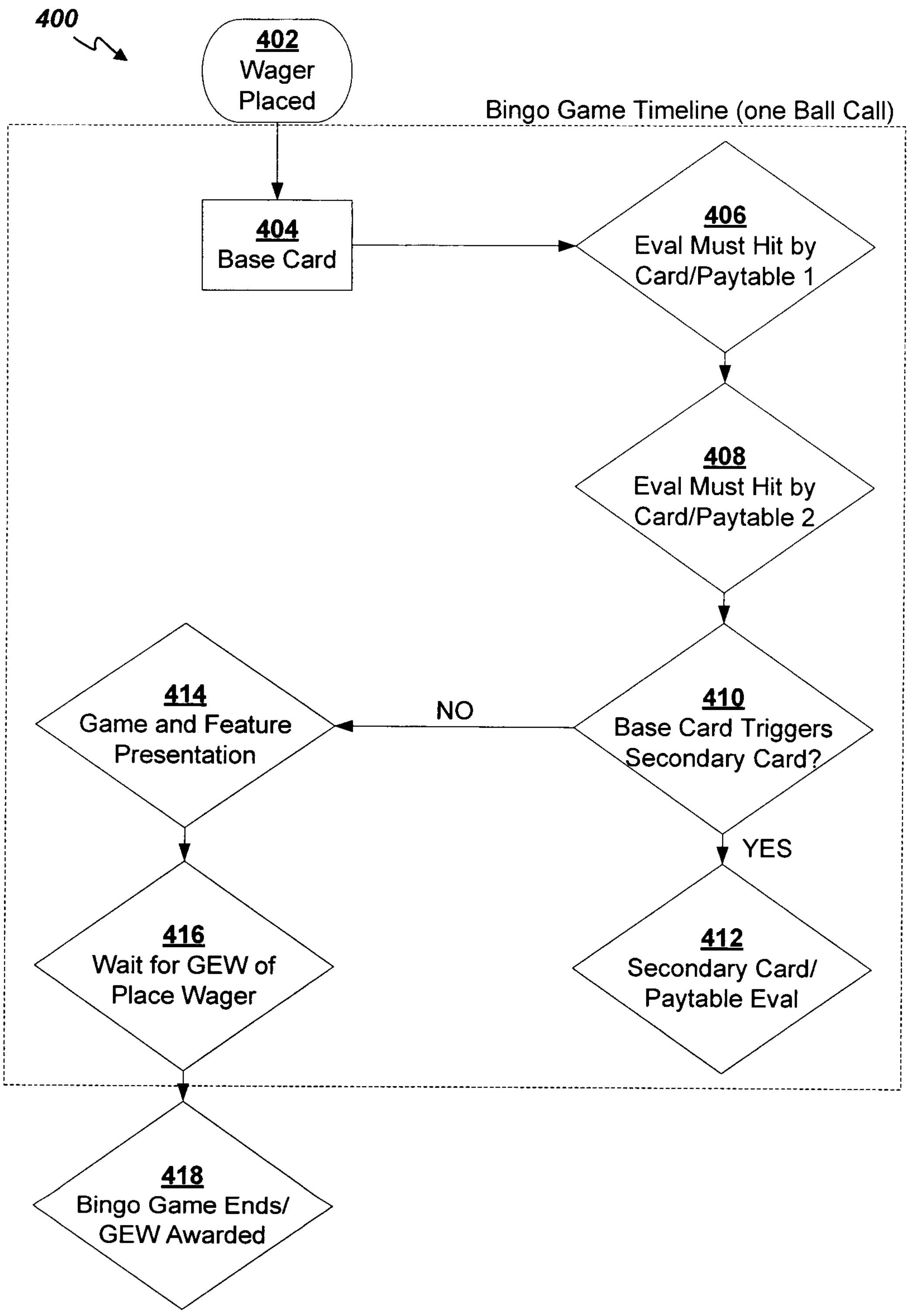
FIG. 4 is flowchart illustrating a process flow of an example Class II bingo game, including a plurality of progressive jackpots, in which each progressive jackpot is evaluated against a plurality of paytables depending upon a value of the progressive jackpot.

FIG. 4 is flowchart illustrating a process flow 400 of a Class II bingo game including a plurality of persistent bonus game jackpots. In an exemplary embodiment, the persistent bonus game jackpots are progressive jackpots, in which each progressive jackpot is evaluated against a plurality of paytables depending upon a value of the progressive jackpot. Notably, the progressive jackpots described herein are not evaluated in conjunction with a Class III-style random number determination. Rather, the progressive jackpots described herein are provided based upon one or more jackpot bingo card evaluations (i.e., both the base bingo game and the progressive jackpot are provided and evaluated using only Class II gaming procedures and mechanisms).

Accordingly, in an example embodiment, a player may place a wager (or provide another input), such as using input switches or buttons 122 of button deck 120 (step 402). Specifically, in at least some embodiments (after having established a credit balance using a credit input mechanism such as bill validator 124), a player may select a "spin" or "bet" button of button deck 120, which may cause system

100 (e.g., an EGM 104A-104X and/or a server system, such as central determination gaming system server 106) to provide (or generate) a bingo card (or a plurality of bingo cards) for use in a Class II base game, such as a bingo game played on an EGM 104A-104X (step 404). The bingo card supplied for use in the base game may, for simplicity, be referred to herein as a "base game bingo card." In addition, as described herein, a ball call may be provided by system 100 for evaluating the base game bingo card.

In addition to supplying the base game bingo card, the central determination gaming system server 106 may also provide or generate a ball call for the bingo game, where the ball call may include a plurality of randomly selected numbers (e.g., seventy-five numbers), against which the base game bingo card may be evaluated. In some embodiments, the base game bingo card may be evaluated against the first forty numbers of a seventy-five number ball call, and a game ending win, as described herein, may be evaluated against all seventy-five of the numbers in the ball call. Accordingly, in response to the ball call, the player's EGM 104A-104X may evaluate the base game bingo card supplied to the player against the ball call to determine whether to provide a base game award to the player (e.g., based upon one or more base game paytables that include one or more winning bingo patterns).

In this example, two progressive jackpot awards (e.g., forming a multi-tier progressive) are provided in association with the base bingo game. However, it will be appreciated that a multi-tier progressive may include any suitable number of progressive jackpots.

Each progressive jackpot includes a lowest (or "reset") value and a highest (or "must-hit-by" or "MHB" value). As a player places wagers in the base bingo game (e.g., using a spin or bet button, as described above), some portion of each wager is added to one or more progressive jackpots to incrementally increase the one or more progressive jackpots. Thus, during gameplay, progressive jackpots increase from a reset value towards an MHB value. As described herein, any progressive jackpot may be awarded to a player at any time, such as, for example, prior to reaching a respective MHB value or when the jackpot reaches its MHB value.

To determine whether to award a progressive jackpot, system 100 (e.g., central determination gaming system server 106) supplies a bingo card (in addition to the base game bingo card) for each of the progressive jackpots in the multi-tier progressive. For simplicity, these bingo cards may be referred to herein a "jackpot bingo cards." In this example, two additional jackpot bingo cards are provided, a first jackpot bingo card for a lower progressive jackpot and a second jackpot bingo card for a higher progressive jackpot. Again, however, it will be appreciated that any suitable number of progressive jackpots may be implemented.

In addition, in some embodiments, greater than a single jackpot bingo card may be provided in association with a progressive jackpot. For example, a collection of jackpot bingo cards may be provided in association with a progressive jackpot. Further, as discussed in greater detail below with reference to FIG. 6, system 100 (e.g., a player's EGM 104A-104X) evaluates each jackpot bingo card against the ball call and a dynamically selected or identified paytable to determine whether to award the respective progressive jackpot (steps 406 and 408).

With continuing reference to FIG. 4, system 100 may also evaluate the base game bingo card (e.g., against the ball call) to determine whether a secondary or bonus game is triggered as a result of one or more triggering patterns occurring on the base game bingo card (step 410). If a secondary game is triggered, system 100 may supply a secondary or bonus game bingo card, which may be evaluated against the ball call and one or more secondary or bonus game paytables to determine whether to provide a bonus or secondary game award (step 412).

On the other hand, if a bonus or secondary game is not triggered (or after completion of the secondary game) system 100 may proceed with presentation of the bingo game on a player's EGM 104A-104X (step 414). For example, in some embodiments, the bingo game may be displayed as a reel game in association with a bingo ball call and bingo card. Specifically, it will be appreciated that a bingo game outcome may be determined based upon the ball call and base game bingo card and mapped to a reel game outcome, so that the bingo game may be displayed as a reel game.

Finally, players may continue to place wagers (resulting in additional base game bingo cards and/or jackpot bingo game cards) until a game ending pattern or game ending win ("GEW") is achieved by one of the players (step 416). In response to a game ending win, the bingo game ends and the game ending win is awarded to the player achieving the win (step 418). It will be appreciated that a player who does not wait for another player to achieve a game ending win but chooses to place an additional wager may receive a new base game bingo card and/or new jackpot game bingo cards, which would be evaluated against a portion of the existing ball call or the existing ball call in its entirety.

Figure 5:
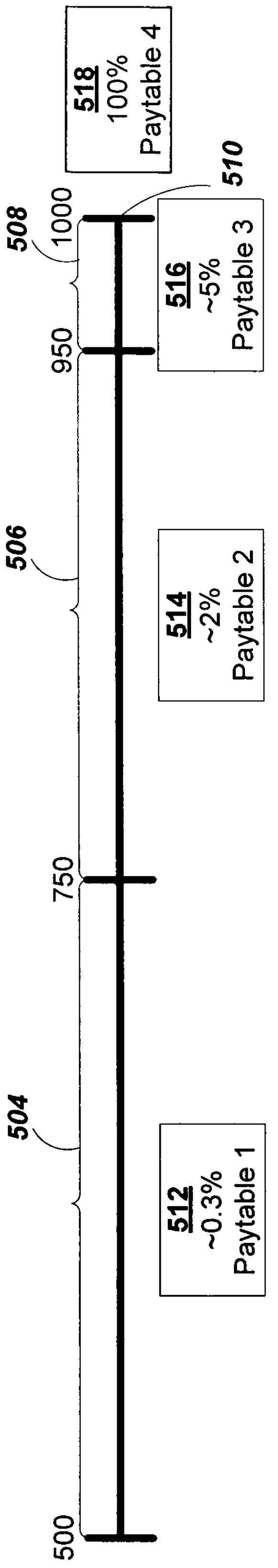
FIG. 5 is a line graph representation of an example progressive jackpot divided into a plurality of value ranges, where each value range is associated with a respective paytable.

FIG. 5 is a line graph representation 500 of an example progressive jackpot 502 divided into a plurality of value ranges (or simply ranges, for brevity), where each range is associated with a respective paytable. In this example, progressive jackpot 502 begins from a lowest (reset) value of $500 and increases to a highest (MHB) value of $1000. It will be appreciated, however, a progressive jackpot may begin from any suitable reset value and may increase to any suitable MHB value.

Progressive jackpot 502 is divided into a plurality of example value ranges. Specifically, a first range 504 includes jackpot values from $500 to $749.99. Similarly, a second range 506 includes jackpot values from $750 to $949.99, and a third range 508 includes jackpot values from $950 to $999.99. Finally, a fourth range 510 includes only the MHB value of $1000. Here again, however, it will be appreciated that the ranges 504-510 are merely exemplary and that any suitable number of ranges may be implemented.

Each of the plurality of ranges 504-510 is also associated with a paytable. In this example, first range 504 is associated with a first paytable 512 (or "Paytable 1"), second range 506 is associated with a second paytable 514 (or "Paytable 2"), third range 508 is associated with a third paytable 516 (or "Paytable 3"), and fourth range 510 is associated with a fourth paytable 518 (or "Paytable 4"). Here again, any suitable number of paytables may be implemented with any suitable number (and partitioning) of ranges. Further, as used herein, a "paytable" may refer to a single winning pattern or a collection of winning bingo patterns.

Moreover, each paytable 512-518 is associated with or specifies a particular chance or probability of winning the associated jackpot 502. Specifically, first paytable 512 is associated with a 0.3% probability that jackpot 502 will be awarded when a value of jackpot 502 is within first range 504 (recall that jackpot 502 is incremented from the reset value towards the MHB value in response to a player wager in the base bingo game). Likewise, second paytable 514 is associated with a 2.0% probability that jackpot 502 will be awarded when a value of jackpot 502 is within second range 506, and third paytable 516 is associated with a 5% probability that jackpot 502 will be awarded when a value of jackpot 502 is within third range 508. Finally, fourth paytable 518 is associated with a 100% probability that jackpot 502 will be awarded when a value of jackpot 502 is within fourth range 510 (i.e., when the value of jackpot 502 reaches the MHB value of $1000).

The probabilities described above are approximate examples. It will be appreciated that other probabilities may be implemented. As shown, however, in the example embodiment, the probability that jackpot 502 will be awarded increases as the value of jackpot 502 is incremented through ranges 504-510 from the reset value of $500 towards the MHB value of $1000, until (and if) the value of jackpot 502 reaches the MHB value, the probability that jackpot 502 will be awarded to a player (or "hit") is 100%, thereby guaranteeing that the must-hit-by jackpot 502 hits at least when the value of jackpot 502 is incremented to the MHB value. In some embodiments, the probability that jackpot 502 will be awarded may not steadily increase as the value of jackpot 502 is incremented through ranges 504-510 from the reset value of $500 towards the MHB value of $1000. Rather, in at least some embodiments, the probability that jackpot 502 will be awarded in a given range 504-510 may be higher or lower than the probability that jackpot 502 will be awarded in a preceding (or next) range 504-510. Thus, in at least some embodiments, the probability that jackpot 502 will be awarded simply "changes" as the value of jackpot 502 is incremented (or reset) through ranges 504-510.

To achieve these changing probabilities of awarding jackpot 502, each paytable 512-518 may be associated with a different number of winning bingo patterns and/or bingo patterns probabilistically more likely to occur. For example, in at least one embodiment, first range 504 may be associated with a first bingo pattern having a probability of occurring approximately 0.3% of the time and/or a collection of bingo patterns that collectively occur approximately 0.3% of the time. Ranges 506-510 may be similarly structured. For example, range 510, which is associated with a 100% probability of awarding jackpot 502, may be associated with a blank bingo pattern (e.g., all free spaces), indicating, for example, that any bingo pattern achieved by a player constitutes a winning bingo pattern. Further, in at least some embodiments, paytables (e.g., paytables 512-518) may be combined in a single paytable (or a single paytable provided) and a probability of awarding jackpot 502 may be selected from the single (combined or standalone) paytable based upon a number of bingo spaces daubed (e.g., balls called that effect a daubed bingo space on a jackpot bingo card).

Further, in some embodiments, the probability that jackpot 502 will be awarded may change based upon a changing number of balls included in a ball call (or balls used to evaluate a jackpot bingo card from the ball call). Likewise, in some embodiments, the probability that jackpot 502 will be awarded may be changed using a randomly provided jackpot bingo card. In addition, in at least some embodiments, the probability that jackpot 502 will be awarded may be changed by adding one or more additional free bingo spaces (e.g., bingo spaces that are always daubed to contribute to a winning bingo pattern) to a jackpot bingo card. In other words, a player may not always be provided a jackpot bingo card in response to a wager; rather system 100 may randomly determine whether to provide a jackpot bingo card each time a place makes a wager.

Figure 6:
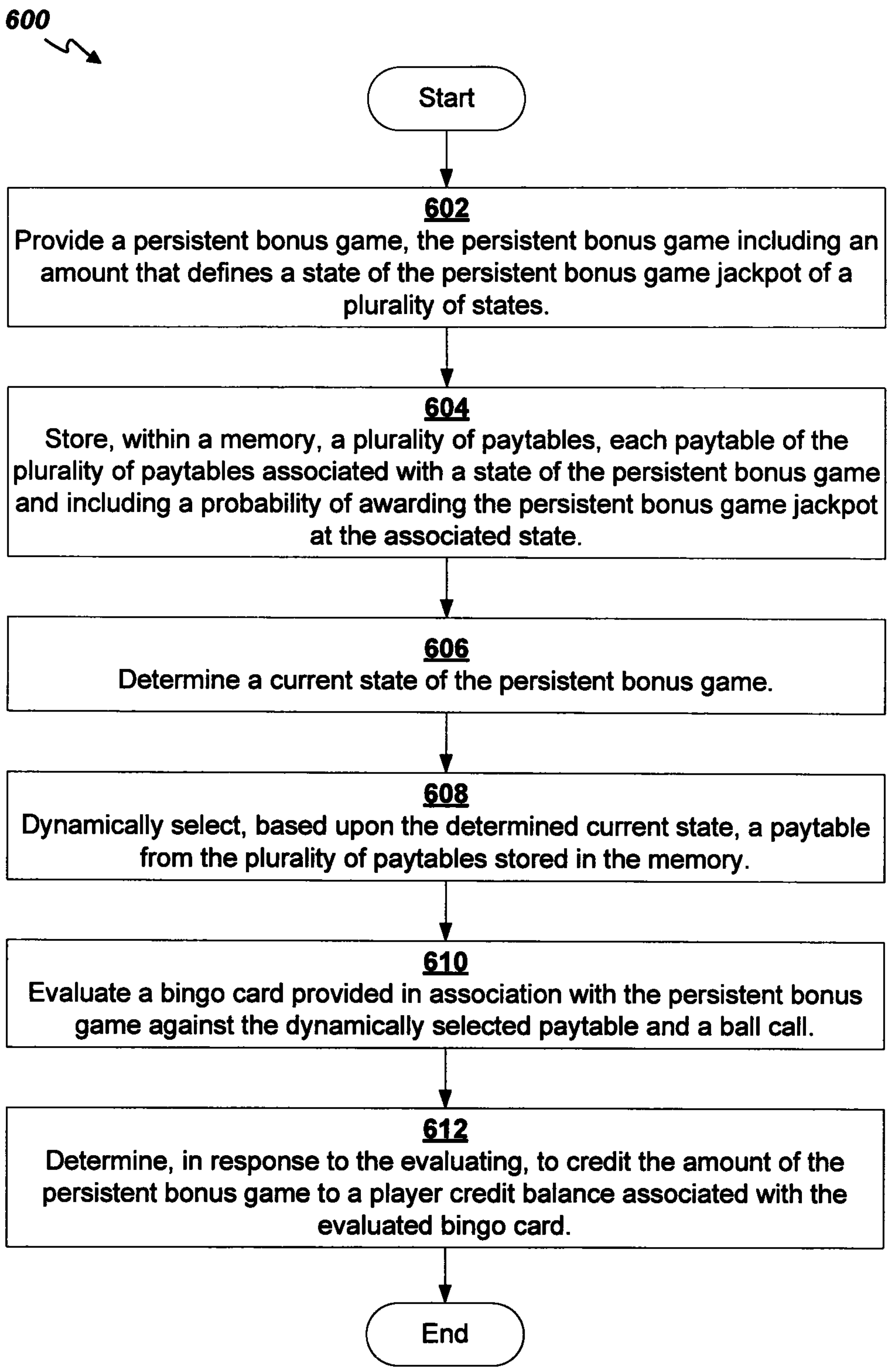
FIG. 6 is a flowchart illustrating a process flow for evaluating an example persistent bonus game jackpot, such as the example progressive jackpot shown in FIG. 5, against a plurality of paytables.

FIG. 6 is a flowchart illustrating a process flow 600 for evaluating an example persistent bonus against a plurality of paytables. System 100 (e.g., progressive system server 112) provides a persistent bonus game (e.g., progressive jackpot 502) (step 602). The persistent bonus game jackpot includes a value or amount that defines a current state of the persistent bonus of a plurality of states. For example, a persistent award bonus amount may be organized in a plurality of ranges, such as ranges 504-510, which increase from a lowest range 504 to a highest range 510. In other embodiments, the persistent award bonus amount may be fixed, and the probability of triggering the bonus payout may be organized in a plurality of ranges, such as ranges 504-510.

System 100 further (e.g., central determination gaming system server 106 or progressive system server 112) provides or maintains a plurality of paytables 512-518 in conjunction with each state of the plurality of states (e.g., each range 514-510) (step 604).

In response to a player wager (e.g., such as via selection of a "spin" or "bet" button), system 100 determines a current state of the persistent bonus game (step 606). For example, in some embodiments, the persistent bonus game may be incrementally increased each time a player of the bingo game places a wager, such that the amount increases from a reset value (e.g., $500) through ranges 504-510 towards an MHB value (e.g., $1000). Accordingly, system 100 may determine the running or accumulating value of the bonus amount in response to each new player wager prior to determining, as described below, whether to award the bonus to a player. In some embodiments, the probability of triggering the bonus game, or bonus payout, may be tracked, from an initial (or reset value), through various ranges, until it reaches a must-hit-by value. The probability of triggering the bonus game increases through the plurality of ranges as one or more players play the base game. Certain base game events may trigger the probability to increase from one level to the next level. Such triggers can include certain types of patterns being hit, certain symbol combinations being displayed, a threshold amount of wagers (quantity or amount wagered), etc.

In such embodiments, having determined the value of the bonus amount, or the current probability of triggering the bonus game, system 100 next determines into which range 504-510 the value of the bonus amount, or the current probability of triggering the bonus game, falls. For example, if the determined value of the bonus game is $550, system 100 determines that the value falls in first range 504. Similarly, if the determined value of the bonus game is $800, system 100 determines that the value falls in second range 506.

In response to determining the current state (e.g., the appropriate range 504-510), system 100 dynamically selects a paytable 512-518 from the plurality of paytables 512-518 (step 608). For example, in some embodiments, in response to determining the appropriate range 504-510, system 100 identifies the paytable 512-518, as described herein, associated with the determined range 504-510 (step 610). For example, if the determined range is first range 504, system 100 identifies (and/or dynamically selects) first paytable 512. Likewise, if the determined range is second range 506, system 100 identifies (and/or dynamically selects) second paytable 514. Thus, a paytable 512-518 is identified based upon an accumulated value of jackpot 502 and dynamically selected in response.

Once an appropriate paytable 512-518 is identified and selected, system 100 (e.g., EGM 104A-104X) evaluates a bingo card (e.g., a "jackpot bingo card," as described above) provided in association with the persistent bonus game jackpot (e.g., jackpot 502) against the ball call provided in the base bingo game and the identified and selected paytable 512-518 (step 610).

System 100 (e.g., EGM 104A-104X) determines, in response to the evaluating, to credit the amount of persistent bonus game jackpot (e.g., jackpot 502) to a player credit balance associated with the evaluated bingo card (step 612). For example, if a player achieves a winning bingo pattern, as specified by the identified and selected paytable 512-518, the player is awarded the persistent bonus game jackpot.

Figure 7:
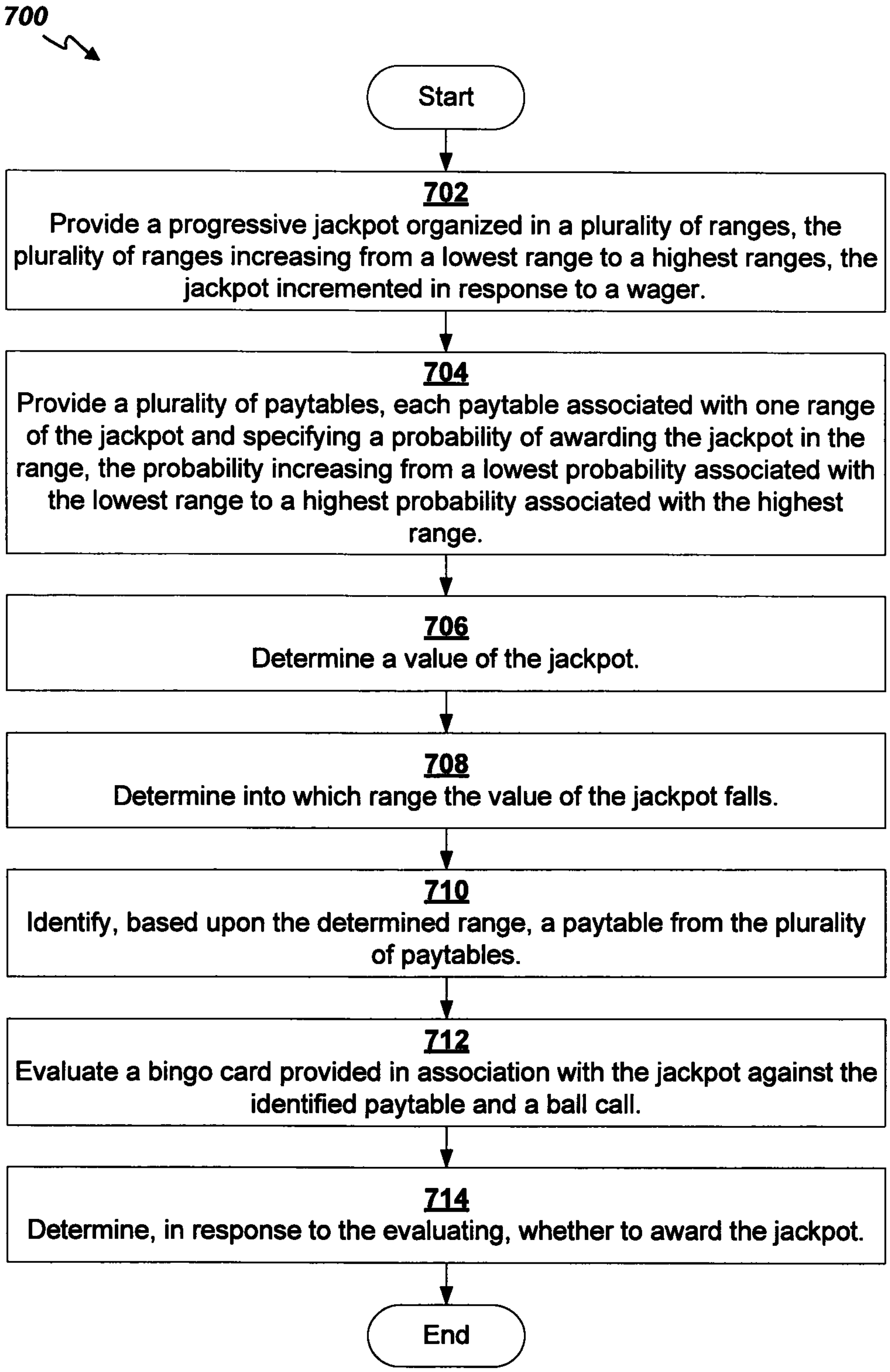
FIG. 7 is a flowchart illustrating a process flow for evaluating an example progressive jackpot against a plurality of paytables depending upon a value of the progressive jackpot, as described more generally with reference to FIG. 4.

FIG. 7 is a flowchart illustrating a process flow 700 for evaluating an example progressive jackpot against a plurality of paytables depending upon a value of the progressive jackpot. System 100 (e.g., progressive system server 112) provides or maintains a progressive jackpot 502 (step 702). As described above, jackpot 502 may represent one jackpot of a multi-tier plurality of progressive jackpots, or jackpot 502 may comprise a single, stand-alone, progressive jackpot. In either case, jackpot 502 is organized in a plurality of ranges, such as ranges 504-510, which increase from a lowest range 504 to a highest range 510. Likewise, system 100 (e.g., central determination gaming system server 106 or progressive system server 112) provides or maintains a plurality of paytables 512-518 in conjunction with each range 514-510 of jackpot 502 (step 704).

In response to a player wager (e.g., such as via selection of a "spin" or "bet" button), system 100 determines a value of jackpot 502 (step 706). As described herein, jackpot 502 may be incrementally increased each time a player of the bingo game places a wager, such that jackpot 502 increases from a reset value (e.g., $500) through ranges 504-510 towards an MHB value (e.g., $1000). Accordingly, system 100 may determine the running or accumulating value of jackpot 502 in response to each new player wager prior to determining, as described below, whether to award jackpot 502 to a player.

Having determined the value of jackpot 502, system 100 next determines into which range 504-510 the value of jackpot 502 falls (step 708). For example, if the determined value of jackpot 502 is $550, system 100 determines that the value of jackpot 502 falls in first range 504. Similarly, if the determined value of jackpot 502 is $800, system 100 determines that the value of jackpot 502 falls in second range 506.

In response to determining the appropriate range 504-510, system 100 identifies the paytable 512-518, as described herein, associated with the determined range 504-510 (step 710). For example, if the determined range is first range 504, system 100 identifies (and/or dynamically selects) first paytable 512. Likewise, if the determined range is second range 506, system 100 identifies (and/or dynamically selects) second paytable 514. Thus, a paytable 512-518 is identified based upon an accumulated value of jackpot 502 and dynamically selected in response.

Once an appropriate paytable 512-518 is identified and selected, system 100 (e.g., EGM 104A-104X) evaluates a bingo card provided in association with jackpot 502 (e.g., a "jackpot bingo card," as described above) against the ball call provided in the base bingo game and the identified and selected paytable 512-518 (step 712). System 100 (e.g., EGM 104A-104X) also determines, in response to the evaluating, whether to award jackpot 502 (step 714). For example, if a player achieves a winning bingo pattern, as specified by the identified and selected paytable 512-518, the player is awarded jackpot 502. As described herein, at least one player of the bingo game is guaranteed to be awarded jackpot 502 if, and when, jackpot 502 reaches fourth range 510 (corresponding to the MHB value).

In various embodiments, the jackpot may be a standalone progressive, a local area progressive, or a multi-site progressive. In various embodiments, there may be different jackpots for different wager amounts.

Thus, a system and method for evaluating a persistent bonus game against a plurality of paytables are provided. In at least some embodiments, the determination whether to award a jackpot is not based upon any Class III Las-Vegas style random number determination but on a comparison of a jackpot bingo card to a ball call and a dynamically selected paytable. To select a paytable, the system may determine a state, such as, for example, running or accumulated value of the jackpot, which may correspond, based upon a range into which the accumulated value falls, to one of a plurality of paytables. Each paytable may, in addition, be associated with or specify a different probability of winning the jackpot.

The systems and methods described herein therefore embody a variety of improvements and technical effects, such as, for example: (a) non-reliance on any Class III Las-Vegas style random number determination in connection with a jackpot evaluation; (b) providing a plurality of paytables for use in determining whether to award a persistent bonus game jackpot such as a progressive jackpot in a Class II bingo game; and (c) providing one or more jackpot bingo cards for use in determining whether to award the persistent bonus game jackpot. In addition, to scale probabilities for triggering a MHB progressive in a Class II game requires using such paytables, as described herein, with matching probabilities and cannot be done using a random number generator due to regulatory restrictions that require the using the bingo ball call and a bingo card for determining game outcomes.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A computer system comprising at least one processor in communication with at least one memory with instructions stored thereon which, when executed by the at least one processor, cause the at least one processor to:

provide bonus game data configured to cause a persistent bonus game jackpot to be displayed at each of a plurality of gaming devices, the persistent bonus game jackpot including an amount that defines a state of the persistent bonus game jackpot of a plurality of predefined states stored in the at least one memory;

determine a current state of the persistent bonus game jackpot;

dynamically select, based upon the determined current state of the persistent bonus game jackpot, a corresponding bonus game paytable from a plurality of bonus game paytables stored in the at least one memory, wherein each bonus game paytable of the plurality of bonus game paytables is associated with a respective state of the persistent bonus game jackpot and includes a probability of awarding the persistent bonus game jackpot at the respective state, and wherein each of the plurality of predefined states is associated with a different probability;

in response to a game instance of a base game at one of the plurality of gaming devices, evaluate a randomly generated matrix associated with the one of the plurality of gaming devices provided in association with the persistent bonus game jackpot against the dynamically selected corresponding bonus game paytable; and determine, in response to the evaluating, to award the amount of the persistent bonus game jackpot to a player credit balance associated with the one of the plurality of gaming devices.

2. The computer system of claim 1, wherein the persistent bonus game jackpot includes a progressive jackpot, the progressive jackpot defining a value incremented in response to the game instance of the base game at one of the plurality of gaming devices.

3. The computer system of claim 2, wherein the progressive jackpot is organized in a plurality of value ranges, the plurality of value ranges increasing from a lowest value range to a highest value range and defining the state of the persistent bonus game jackpot.

4. The computer system of claim 3, wherein to determine the current state of the persistent bonus game jackpot, the instructions cause the at least one processor to:

determine the value of the progressive jackpot; and determine into which value range of the plurality of value ranges the value of the progressive jackpot falls.

5. The computer system of claim 3, wherein the probability of awarding the persistent bonus game jackpot increases from a lowest probability associated with the lowest value range to a highest probability associated with the highest value range.

6. The computer system of claim 3, wherein a maximum of the value of the progressive jackpot is defined by a must-hit-by value.

7. The computer system of claim 6, wherein the highest value range is defined in part by the must-hit-by value, and a probability of awarding the persistent bonus game jackpot associated with the highest value range corresponds to automatically awarding the persistent bonus game jackpot.

8. The computer system of claim 3, wherein the lowest value range is defined by a reset value under which a probability of awarding the persistent bonus game jackpot is zero.

9. The computer system of claim 2, wherein the progressive jackpot is at least one of a standalone progressive, a local area progressive, or a multi-site progressive.

10. The computer system of claim 2, wherein the persistent bonus game jackpot includes a plurality of progressive jackpots corresponding to different wager amounts.

11. A method of electronic gaming implemented by at least one processor in communication with at least one memory, the method comprising:

providing bonus game data to facilitate display of a persistent bonus game jackpot at a plurality of gaming terminals, the persistent bonus game jackpot including an amount that defines a state of the persistent bonus game jackpot of a plurality of states stored in the at least one memory;

determining a current state of the persistent bonus game jackpot;

selecting, based upon the determined current state of the persistent bonus game jackpot, a corresponding paytable from a plurality of paytables stored in the at least one memory, wherein each paytable of the plurality of paytables is associated with a respective state of the persistent bonus game jackpot and includes a probability of awarding the persistent bonus game jackpot at the respective state, and wherein each of the plurality of states is associated with a different probability;

evaluating a randomly generated matrix associated with one of the plurality of gaming terminals provided in association with the persistent bonus game jackpot against the selected corresponding paytable; and determining, in response to the evaluating, to award the amount of the persistent bonus game jackpot to a player credit balance associated with the evaluated randomly generated matrix.

12. The method of claim 11, wherein the persistent bonus game jackpot includes a progressive jackpot, the progressive jackpot defining a value incremented in response to a game instance of a base game associated with one of the plurality of gaming terminals.

13. The method of claim 12, wherein the progressive jackpot is organized in a plurality of value ranges, the plurality of value ranges increasing from a lowest value range to a highest value range and defining the state of the persistent bonus game jackpot.

14. The method of claim 13, wherein determining the current state of the persistent bonus game jackpot comprises:

determining the value of the progressive jackpot; and determining into which value range of the plurality of value ranges the value of the progressive jackpot falls.

15. The method of claim 13, wherein the probability of awarding the persistent bonus game jackpot increases from a lowest probability associated with the lowest value range to a highest probability associated with the highest value range.

16. At least one non-transitory computer-readable media having instructions embodied thereon, wherein when executed by a system including at least one processor in communication with at least one memory and a plurality of gaming devices, the instructions cause the at least one processor to at least:

provide bonus game data configured to facilitate display of a persistent bonus game jackpot, the persistent bonus game jackpot including an amount that defines a state of the persistent bonus game jackpot of a plurality of states stored in the at least one memory;

determine a current state of the persistent bonus game jackpot;

dynamically select, based upon the determined current state of the persistent bonus game jackpot, a corresponding jackpot paytable from a plurality of jackpot paytables stored in the at least one memory wherein each jackpot paytable of the plurality of jackpot paytables is associated with a respective state of the persistent bonus game jackpot and includes a probability of awarding the persistent bonus game jackpot at the respective state, and wherein each of the plurality of states is associated with a different probability;

evaluate a bingo card associated with the one of the plurality of gaming devices provided in association with the persistent bonus game jackpot against the dynamically selected corresponding jackpot paytable and a ball call; and determine, in response to the evaluating, to award the amount of the persistent bonus game jackpot to a player credit balance associated with the evaluated bingo card.

17. The at least one non-transitory computer-readable media of claim 16, wherein the persistent bonus game jackpot includes a progressive jackpot, the progressive jackpot defining a value incremented in response to a game instance of a base game associated with one of the plurality of gaming devices.

18. The at least one non-transitory computer-readable media of claim 17, wherein the progressive jackpot is organized in a plurality of value ranges, the plurality of value ranges increasing from a lowest value range to a highest value range and defining the state of the persistent bonus game jackpot.

19. The at least one non-transitory computer-readable media of claim 18, wherein to determine the current state of the persistent bonus game jackpot, the instructions cause the at least one processor to:

determine the value of the progressive jackpot; and determine into which value range of the plurality of value ranges the value of the progressive jackpot falls.

20. The at least one non-transitory computer-readable media of claim 18, wherein the probability of awarding the persistent bonus game jackpot increases from a lowest probability associated with the lowest value range to a highest probability associated with the highest value range.

* * * * *